United States Patent
Xu et al.

(10) Patent No.: US 7,433,316 B2
(45) Date of Patent: Oct. 7, 2008

(54) SUMMARIZING NODES IN ROUTE PROPAGATION IN AUXILIARY NETWORK FOR P2P OVERLAY NETWORKS

(75) Inventors: Zhichen Xu, Sunnyvale, CA (US); Mallik Mahalingam, Sunnyvale, CA (US); Magnus Karlsson, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 10/368,426

(22) Filed: Feb. 20, 2003

(65) Prior Publication Data
US 2004/0165536 A1    Aug. 26, 2004

(51) Int. Cl.
*G01R 31/08*    (2006.01)
(52) U.S. Cl. .................................. 370/238; 370/251
(58) Field of Classification Search ............... None
See application file for complete search history.

(56) References Cited

U.S. PATENT DOCUMENTS

| | | | |
|---|---|---|---|
| 6,473,405 B2 * | 10/2002 | Ricciulli | 370/238 |
| 6,512,768 B1 * | 1/2003 | Thomas | 370/389 |
| 6,985,928 B2 * | 1/2006 | Zhang et al. | 709/213 |
| 7,136,927 B2 * | 11/2006 | Traversat et al. | 709/230 |
| 2003/0063568 A1 * | 4/2003 | Teig et al. | 370/252 |
| 2004/0042403 A1 * | 3/2004 | Xu et al. | 370/238 |
| 2004/0064512 A1 * | 4/2004 | Arora et al. | 709/206 |
| 2004/0064556 A1 * | 4/2004 | Zhang et al. | 709/225 |
| 2004/0064693 A1 * | 4/2004 | Pabla et al. | 713/168 |

OTHER PUBLICATIONS

Ratnasamy et al., "A Scalable Content Addressable", 2001, ACM, pp. 161-172.*

* cited by examiner

*Primary Examiner*—Edan Orgad
*Assistant Examiner*—Jung Park (57) ABSTRACT

Described herein is a method for creating route summaries in an auxiliary network for a peer-to-peer (P2P) overlay network for routing a data packet. The method comprises dividing a d-dimensional Cartesian space of nodes in the P2P overlay network into multiple virtual grids that form the auxiliary network, numbering each virtual grid, summarizing default overlay network zones of the P2P overlay network corresponding to each of the virtual grids that form the auxiliary network, receiving a data packet, and routing the data packet to a packet destination using one of the P2P overlay network and the auxiliary network.

12 Claims, 8 Drawing Sheets

SUMMARIZING NODES IN ROUTE PROPAGATION IN AUXILIARY NETWORK FOR P2P OVERLAY NETWORKS

RELATED APPLICATIONS

The following applications of the common assignee, incorporated by reference in their entirety, may contain some common disclosure and may relate to the present invention:

U.S. patent application Ser. No. 10/284,100 filed on Oct. 31, 2002 entitled "AUTONOMOUS SYSTEM TOPOLOGY BASED AUXILIARY NETWORK FOR P2P OVERLAY NETWORKS"; and U.S. patent application Ser. No. 10/284,355 filed on Oct. 31, 2002 entitled "LANDMARK NUMBERING BASED AUXILIARY NETWORK FOR P2P OVERLAY NETWORKS".

FIELD OF THE INVENTION

This invention relates generally to peer-to-peer ("P2P") overlay networks. In particular, the invention relates generally to summarizing route propagation information in auxiliary networks for P2P overlay networks.

BACKGROUND OF THE INVENTION

Providing scalable and efficient content delivery is becoming more important as the demand for applications such as streaming media is growing fast. Content Distribution Networks ("CDN") and network service providers, advocate using network overlays for providing scalable and robust Internet based applications. Typical overlays are administrator configured, and due to the centralized nature of the overlay construction process, it is not feasible to construct large overlays.

Recent application-level overlay networks, such as CAN, eCAN, Chord and PAST, are scalable and self-organizing in nature. Nodes in these networks collectively contribute towards a fault-tolerant and administration-free storage space. The basic functionality these systems provide is a distributed hash table ("DHT"). In these systems, an object is associated with a key. Every node in the system is responsible for storing objects whose keys map to the ID of the node (via hashing). Retrieving an object amounts to routing to a node that is responsible for storing that object. The routing path on these overlay networks is at the application-level rather than at the IP level.

While elegant from a theoretical perspective, these systems suffer from at least two limitations. First, they rely on application-level routing that largely ignores the characteristics of the underlying physical networks. Because the underlying physical characteristics are not taken into consideration, excessive routing delays typically result. Second, they construct a homogeneous structured overlay network, while in reality, the nodes usually have different constraints and capacities such as storage, load, packet forwarding capacities and network connections.

In addition, overlay networks are typically constrained. In other words, the number of connections for a node is fixed or limited. Because of the constraints, the ability to accurately model the underlying physical characteristics is limited as well. Further, the earlier auxiliary networks do not handle the dynamic nature of the underlying network well, for example, when nodes exit or enter the network.

Still further, the amount of state information that needs to be maintained in the overlay network may be excessive.

SUMMARY OF THE INVENTION

According to an embodiment of the present invention, a method for creating route summaries in an auxiliary network for a P2P overlay networks may include dividing a d-dimensional Cartesian space of nodes into multiple virtual grids, numbering each virtual grid, and summarizing default overlay network zones corresponding to each of the virtual grids.

According to another embodiment of the present invention, a method for advertising routing information using route summaries for an auxiliary network for a P2P overlay network, wherein route summary includes a d-dimensional Cartesian space of nodes into multiple virtual grids and default overlay network zones are summarized into corresponding virtual grids. The method may include determining a virtual grid ID for one or more nodes of the overlay network corresponding to each of the one or more nodes, determining a transport address for each of the one or more nodes; and advertising the virtual grid ID and the transport address corresponding to each of the one or more nodes.

According to yet another embodiment of the present invention, a method for routing using an expressway node based route summaries for an auxiliary network for a P2P overlay network, wherein route summary includes a d-dimensional Cartesian space of nodes into multiple virtual grids and default overlay network zones are summarized into corresponding virtual grids, the method may include receiving a packet, determining if a packet destination information is in a route summary for the expressway node, and routing the packet to the packet destination if it is determined that the packet destination information is in the route summary.

According to a further embodiment of the present invention, a method for routing using ordinary node based route summaries for an auxiliary network for a P2P overlay network, wherein route summary includes a d-dimensional Cartesian space of nodes into multiple virtual grids and default overlay network zones are summarized into corresponding virtual grids. The method may include receiving a packet, determining if the packet has been tagged to use a default overly for routing, and routing the packet using the default overlay network if it is determined that the packet has been tagged to use the default overlay.

BRIEF DESCRIPTION OF THE DRAWINGS

Features of the present invention will become apparent to those skilled in the art from the following description with reference to the drawings, in which.

DETAILED DESCRIPTION

For simplicity and illustrative purposes, the principles of the present invention are described by referring mainly to exemplary embodiments thereof. However, it is to be understood that the same principles are equally applicable to many types of auxiliary networks for P2P overlay networks.

In an embodiment of the present invention, an existing overlay network, such as CAN, eCAN, Tapestry, Chord, Pastry, and the like, may be augmented with an auxiliary network to improve performance (for example, routing performance). The auxiliary network, also termed "expressway network", allows the heterogenic conditions, i.e. the varying characteristics of the underlying physical networks, to be exploited. In the expressway network, heterogenic conditions such as physical proximity, forwarding capacity and connectivity of the nodes of the network may be taken into account. Also, unlike the previous networks, the expressway network may be unconstrained, for example, in its storage capacity of routing-information.

As mentioned above, examples of an overlay networks include CAN, eCAN, Pastry, and Chord. With CAN, the problem of data placement/retrieval over large-scale storage systems is abstracted as hashing that maps "keys" onto "values". CAN organizes the logical space as a d-dimensional Cartesian space (a d-torus). The Cartesian space is partitioned into zones, with one or more nodes serving as owner(s) of the zone. An object key is a point in the space, and a node owns the object if it owns the zone that contains the point. Routing from a source node to a destination node boils down to routing from one zone to another in the Cartesian space. Node addition corresponds to picking a random point in the Cartesian space, routing to the zone that contains the point, and splitting the zone with its current owner(s). Node removal amounts to having the owner(s) of one of the neighboring zone take over the zone owned by the departing node. In CAN, two zones are neighbors if they overlap in all but one dimension along which they neighbor each other.

eCAN augments CAN's routing capacity with routing tables of larger span. Every k CAN zones represent an order-1 zone, and k order-i zones represents an order-(i+1) zone. The variable k is called the zone coverage factor. As a result, a node is an owner of a CAN zone and is also resident of the high-order zones that encompass the CAN zone. Besides its default routing neighbors that are CAN zones, a node also has high-order routing neighbors that are representatives of its neighbors in the high-order zones. eCAN provides flexibility in selecting the high-order neighbors. When selecting a representative for a high-order neighbor, a node may be selected that is closest to the current node amongst all the nodes that belong to the neighboring high-order zone.

Figure 1:
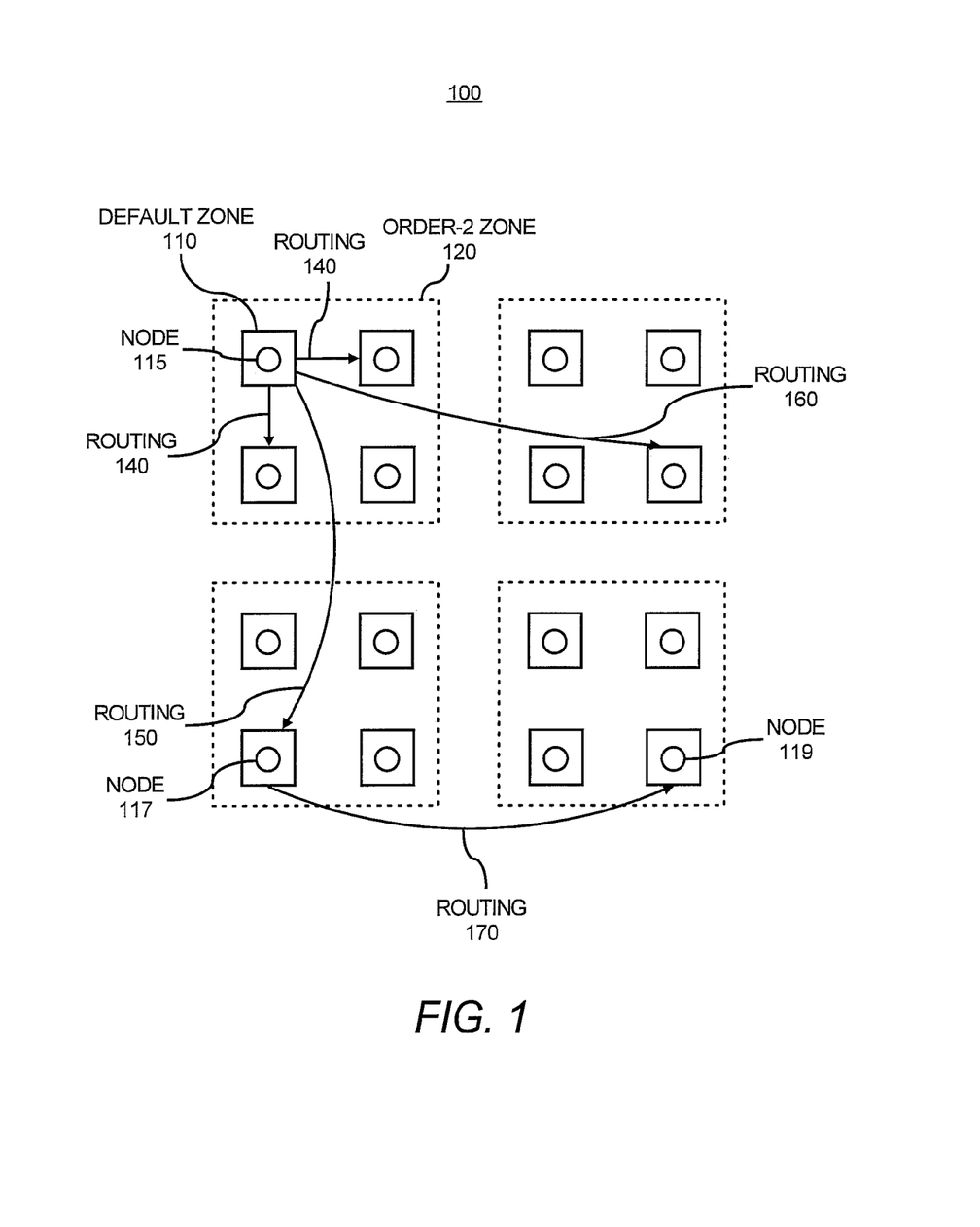
FIG. 1 is an exemplary diagram illustrating a conventional eCAN overlay network.

FIG. 1 illustrates an exemplary eCAN 100. The eCAN 100 includes default CAN zones 110, and in this example, each default CAN zone 110 is 1/16 of the entire Cartesian space. Also, four neighboring default zones 110 make one order-2 eCAN zone 120. Thus, in this example, there are sixteen default zones and four order-2 zones. While not shown, the neighboring order-2 zones may be used to construct order-3 zones, order-3 zones used to construct order-4 zones, and so on.

In addition, a node may own a particular default CAN zone. In this instance, the node 115 owns the CAN zone 110 in the upper left. In addition, a node is a resident of the higher order zones that encompass the particular default zone. The routing table of node 115 includes a default routing information of CAN (represented as arrows 140) that link only to the immediate neighbors of node 115. The routing table also includes high-order routing information (represented as arrows 150 and 160) that link to nodes of neighboring eCAN zones 120 and 130. In this example, node 115 may reach node 119 using eCAN routing (115, 117, 119).

In an embodiment of the present invention, using an auxiliary network like the expressway network, the heterogeneity of nodes may be represented without altering the overlay network like CAN and eCAN. In other words, the characteristics of the underlying physical network is taken into consideration. However, it should be noted that the expressway network may be used to augment many types of overlay networks and is not limited to CAN and eCAN.

In the expressway network, each node may establish connections to nodes in its physical proximity that are "well-connected" and have good forwarding capacities. For example, routers and gateways and the nodes that are near to the routers and gateways are better suited to forward packets. Forwarding capacities typically refers to network bandwidth and packet processing abilities. These well-connected nodes are called expressway nodes. The expressway nodes themselves may be linked to other expressway nodes that are close by called expressway neighbors to form an expressway.

The expressway may be used to route information in the network. Note that the number of expressway links from a particular expressway node to other expressway nodes is unconstrained. In other words, the number of expressway links established by each expressway node is arbitrary and maybe different for each expressway node.

For a given default overlay network, such as eCAN, a corresponding expressway network may be constructed in many different ways. While not exhaustive, the expressway nodes typically may serve the following purposes: (1) to propagate routing information when nodes join or leave or when the network conditions change; (2) to resolve the routing destinations; and (3) to forward information packets for multicasting or for better IP routing performance.

As noted above, the auxiliary expressway network includes expressway nodes. The expressway nodes may establish expressway connections amongst each other. Typically, the expressway nodes establish connections with other expressway nodes that are "close" in network distance. By establishing expressways with other close expressway nodes, the routing performance of the network may be improved. In a similar manner, ordinary nodes—i.e. the non-expressway nodes—also may establish connections with expressway nodes that are close as well. In this manner, data from any node—ordinary or expressway node—may be forwarded to the destination efficiently.

Distances may be measured in a variety of ways. While note exhaustive, the ways to determine distances include simple geographical distance, peak latency, average and mean latencies, number of autonomous system hops, number of network hops, and the like.

In an embodiment of the present invention, expressway nodes determine and advertise or publish their positions—typically over the default overlay network. A particular expressway node may determine its proximity to other expressway nodes based on the published information. Based on the proximity information, the particular expressway node may establish expressway connections with other expressway nodes.

While not exhaustive, the following examples are some criteria that determine when a particular expressway node may establish an expressway connection with one or more other expressway nodes. One example is that the particular expressway node may establish expressway connections with a pre-determined number of the closest other expressway nodes. Note that the pre-determined number may be one. Also note that the pre-determined number may be different for each expressway node, i.e. is arbitrary. Another example is that the particular expressway node may establish expressway connections with all other expressway nodes that are within a pre-determined distance from itself. Again, the pre-determined distance may be different for each expressway node.

Indeed, the criteria may be a combination. For example, an expressway node may always establish a pre-determined minimum number of connections, but may also establish connections with all other expressway nodes within a pre-determined distance.

Similarly, an ordinary node may determine its proximity to expressway nodes based on the published positions. Based on the proximity information, each ordinary node may establish ordinary connections with expressway nodes in a similar manner as described above. The criteria used establish the ordinary connections may be individualized for each ordinary node.

Figure 2:
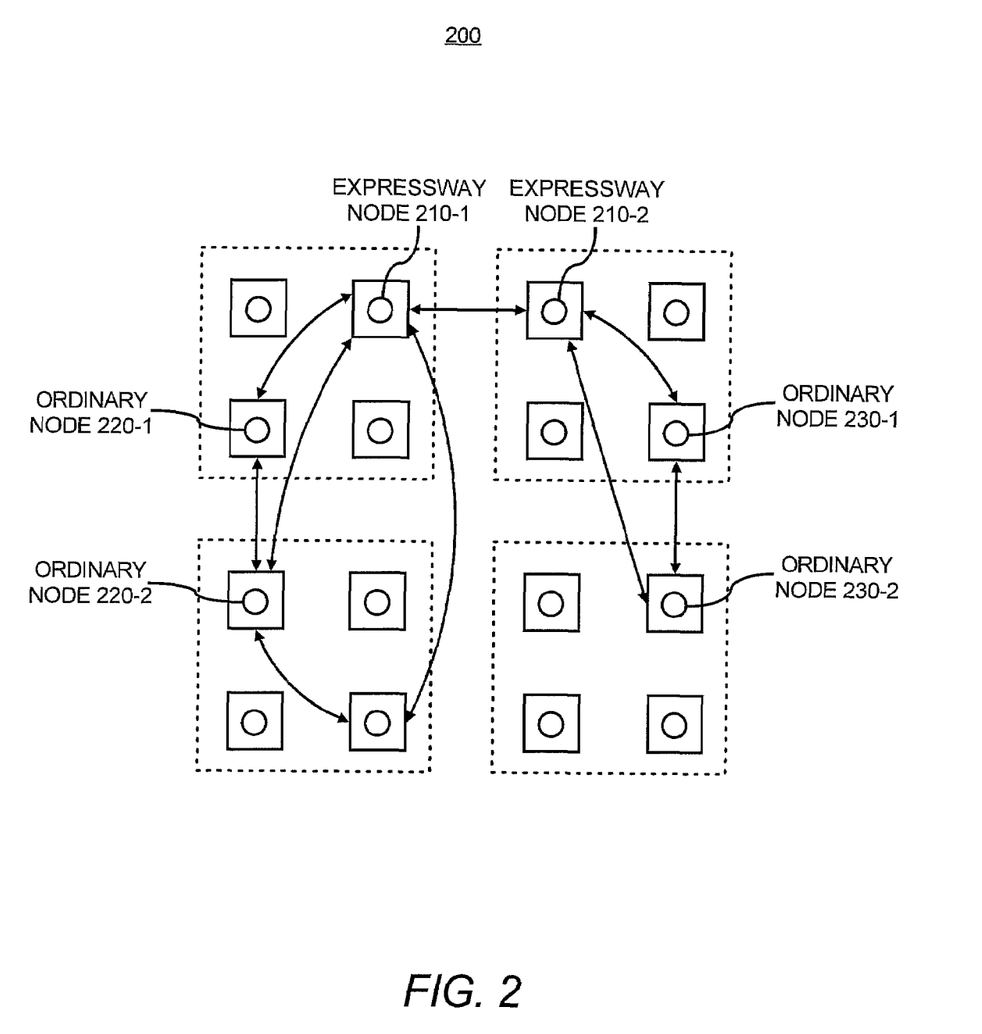
FIG. 2 is an exemplary diagram illustrating the use of autonomous system level topology to select expressway neighbors in a default overlay according to an embodiment of the present invention.

The auxiliary expressway network may be constructed in a variety of ways including being based on autonomous system ("AS") level topology and landmark numbering. An autonomous system (or AS) may be viewed as a network or a group of networks under a common administration with a common set of routing policies. FIG. 2 illustrates a diagram 200 illustrating the use of AS topology to select expressway neighbors in a default overlay, for example eCAN. The diagram 200 includes expressway nodes 210-1 and 210-2. The diagram 200 also includes ordinary nodes 220-1, 220-2 and 220-3. These nodes all belong to the same AS as the expressway node 210-1. In addition, the diagram 200 also includes ordinary nodes 230-1 and 230-2 which belong to the same AS as the expressway node 210-2. Note that the expressway nodes establish an expressway connection between themselves to form the expressway. Also, all ordinary nodes establish connections with expressway nodes in their proximity. Further, each node of an AS establishes connections with other nodes in the same AS.

As noted above, landmark numbering may be used to form the expressways. In the expressway network utilizing landmark numbering, a plurality of landmark nodes are chosen that are randomly scattered throughout a network, for example the Internet. An example of a landmark node may be a gateway server in Washington, D.C. and another may be a router in Palo Alto, Calif. The landmark nodes may be a part of the overlay network or may be a standalone.

Figure 3:
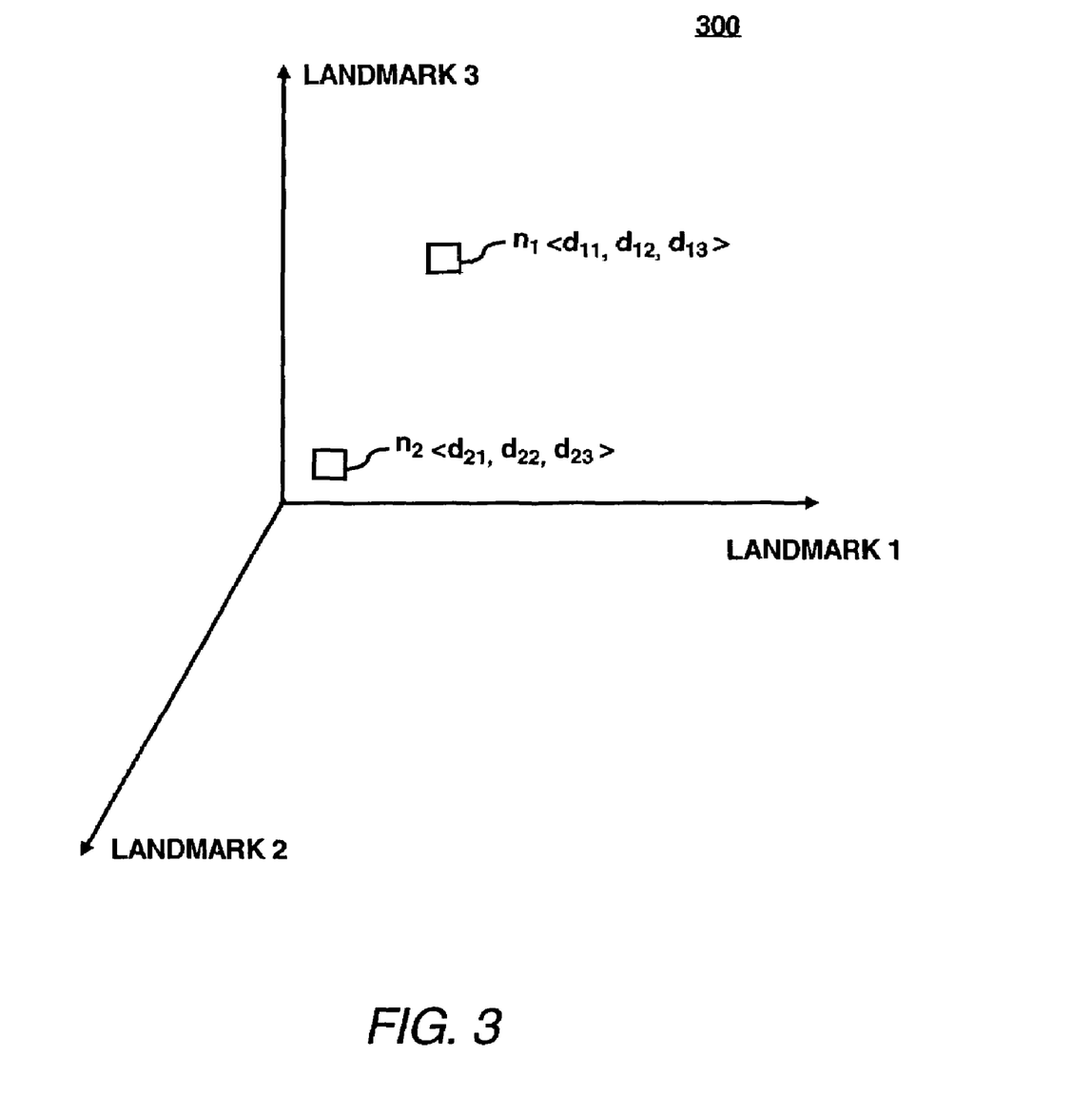
FIG. 3 is an exemplary diagram illustrating a landmark space according to an embodiment of the present invention.

Each expressway node may determine its position relative to the landmark nodes by measuring its distance from each of the landmark nodes. For example, if there are n landmark nodes, then for a node A, the measured distance from the node A to the landmark nodes may be represented by a sequence $<d_1, d_2, \ldots, d_n>$ wherein $d_1$ is the distance from node A to the first landmark node, $d_2$ is the distance from node A to the second landmark node and so on. The node A then may be viewed as being positioned in an n-dimension Cartesian space using the sequence $<d_1>, d_2, \ldots, d_n>$ as its coordinates. In other words, the landmark nodes serve as axis of the Cartesian coordinate system. This Cartesian space is termed the landmark space. The nodes that are close to each other should have similar landmark measurements.

FIG. 3 illustrates an exemplary landmark space 300 using three landmark nodes. As shown in FIG. 3, the three landmark nodes—landmark1, landmark2 and landmark3—serve as the basis of the coordinate axes of the landmark space. The landmark space 300 includes two nodes $n_1$ and $n_2$ with coordinates $<d_{11}, d_{12}, d_{13}>$ and $<d_{21}, d_{22}, d_{23}>$, respectively. How close the nodes $n_1$ and $n_2$ are to each other may be determined based on their respective coordinate values.

As indicated above, when an expressway node joins an expressway (or periodically), it may advertise all the local nodes that are in its physical proximity to neighboring expressway nodes. Also, each ordinary node may keep the addresses of the local expressway nodes and the expressway nodes may maintain route summaries.

However, the number of entries in a route summary is typically on the order of the number of nodes in the system. In a large network, the amount of information is likely to be large as well, and thus may become expensive to maintain and difficult to keep the routing state current. Thus, it becomes desirable to reduce the routing states that the nodes have to keep.

Figure 4:
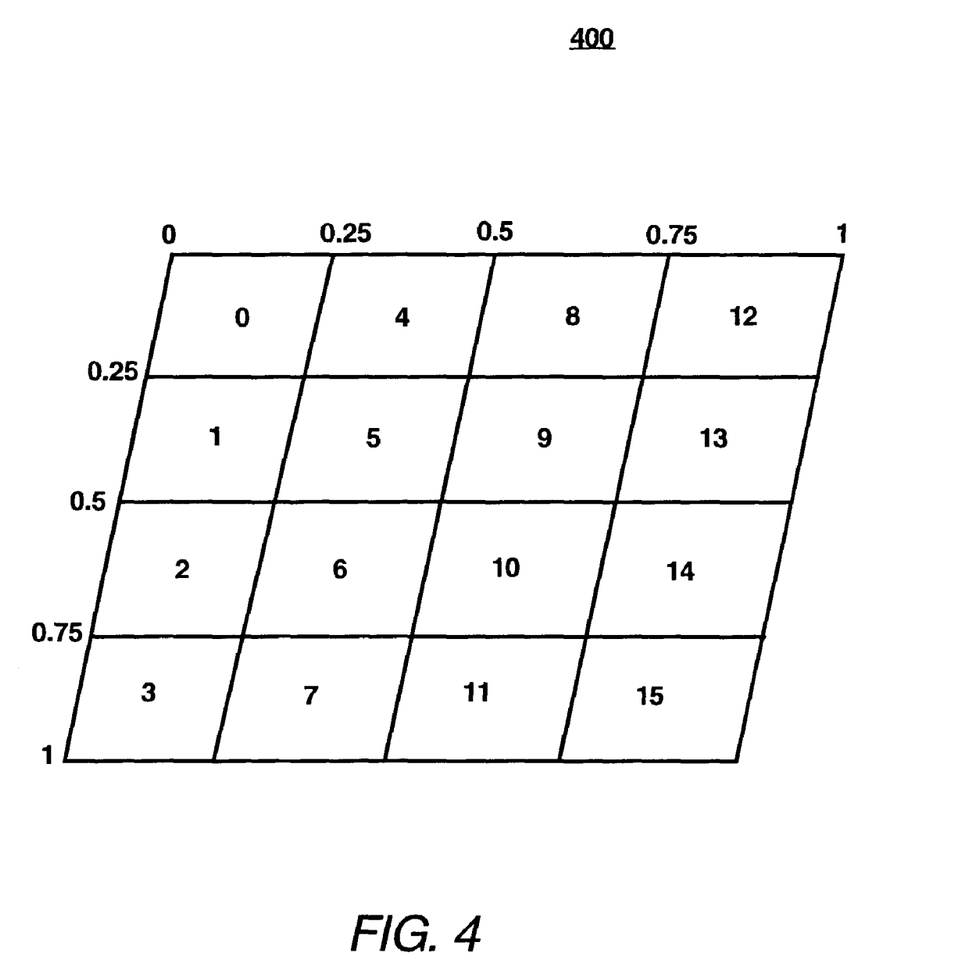
FIG. 4 is an exemplary diagram illustrating an partitioning of Cartesian space into grids according to an embodiment of the present invention.

To reduce the amount of routing state information maintained at each node, routes may be advertised with summarization. In an embodiment of the present invention, the summarization is based on partitioning the d-dimensional Cartesian space into virtual grids. As an example, FIG. 4 is a diagram 400 illustrating partitioning of a two-dimensional Cartesian space using 4×4 grids. As shown in FIG. 4, the two-dimensional Cartesian space is divided into 16 grids numbered from 0 to 15. During route advertisement, a node advertises the grid ID that the node maps to as an indication of its position. For example, if the node's coordinate is {0.1, 0.3}, then the node would advertise the grid ID of 4.

Figure 5:
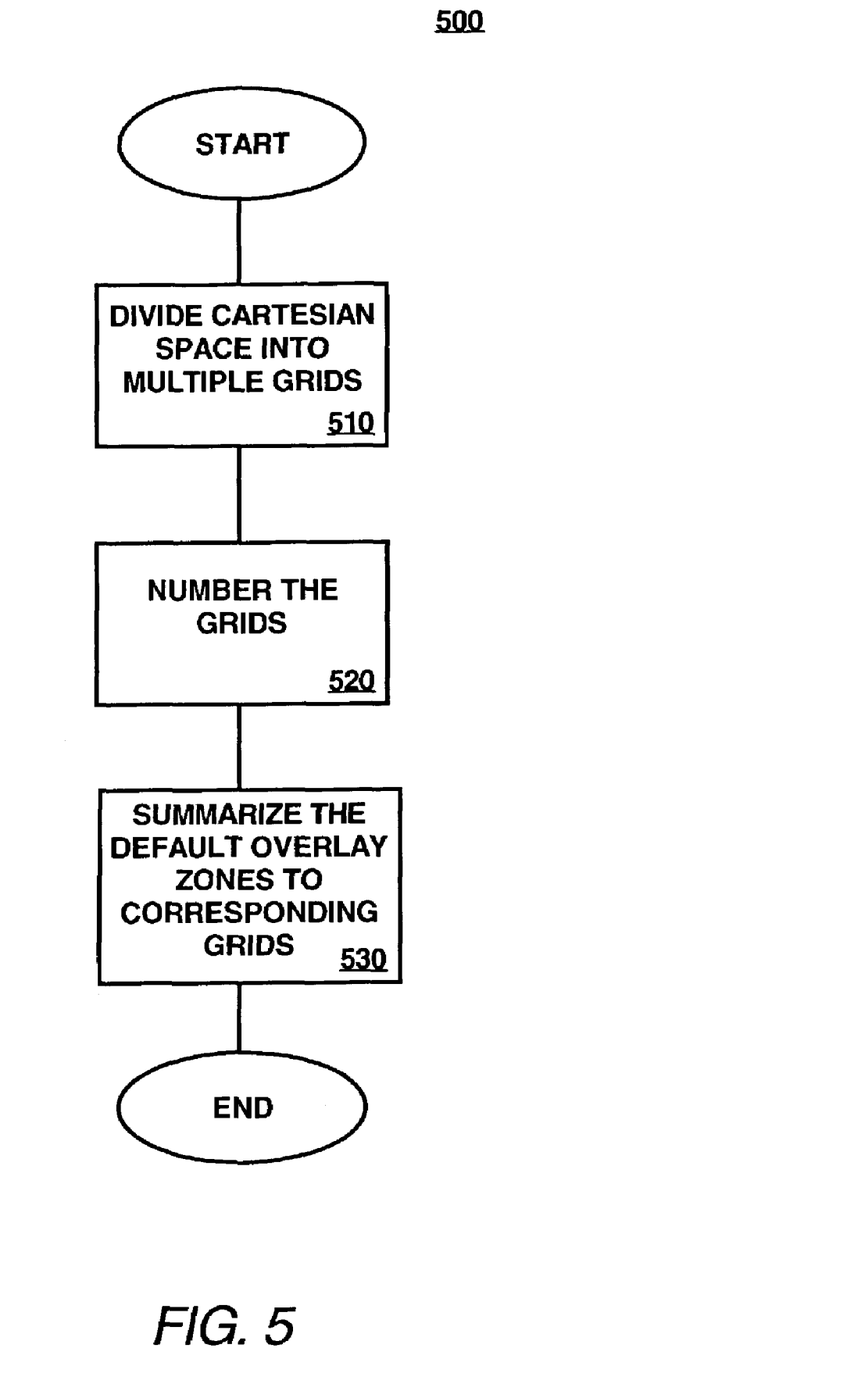
FIG. 5 is a flow graph illustrating an exemplary method for summarizing a Cartesian space for route advertisement according to an embodiment of the present invention.

FIG. 5 is a flow graph illustrating an exemplary method 500 for summarizing a Cartesian space for route advertisement. As shown, the d-dimensional Cartesian space may be divided into multiple virtual grids (step 510). It is preferred that the grids are of equal size. Each virtual grid may be numbered, i.e. each virtual grid may be assigned a virtual grid ID (step 520). It is also preferred that the number of grids be $m^d$, where d represents a dimensionality of the Cartesian space and m is an integer. The grids may be numbered between 0 and $m^d-1$.

Also, the default overlay zones corresponding to the virtual grid IDs may be summarized (step 530). Typically, each zone of the default overlay, such as a CAN zone, may be summarized using the grid ID of the virtual grid in which the center of the default zone falls. Note that the summarization is not limited to CAN and eCAN. As an example, for any DHT-based overlays such as Pastry and Tapestry, the prefix or suffix of the nodes may be used to summarize the logical space. In an embodiment of the present invention, a summary can be a prefix (or suffix) of a set of nodes whose IDs in the P2P overlay share the same prefix (or suffix). A routing summary is generic and applicable to many types of P2P overlay.

An algorithm for route advertisement using the virtual grids is similar to the standard distance vector algorithm. However, in an embodiment of the present invention, the following apply: (i) only expressway nodes may participate in route advertisement; (ii) the node's transport address and the virtual grid that is used for summarizing the nodes may be advertised; and (iii) the route advertisement messages may be controlled with a time-to-live ("TTL") value. The TTL value may control how far an advertisement can be propagated.

Higher TTL values results in better performance but comes at a higher communication cost. The TTL value may be expressed as a number of expressway-node hops.

Having a small number of virtual grids would produce less precise advertised information. However, the benefit is that routing state that an expressway node has to maintain becomes smaller as well. Even when the virtual grid is larger than the zone to be advertised, routing to any zone that belongs to the virtual grid guarantees that the target is inside the virtual grid and can be routed with the default overly routing in a bounded number of logical hops.

In an embodiment of the present invention, each ordinary node may keep the address of the local expressway nodes and the expressway nodes may maintain route summaries. The number of entries in the route summary is on the order of the number of virtual grids used for summarizing the nodes instead of being on the order of the number of nodes as disclosed above.

Figure 6:
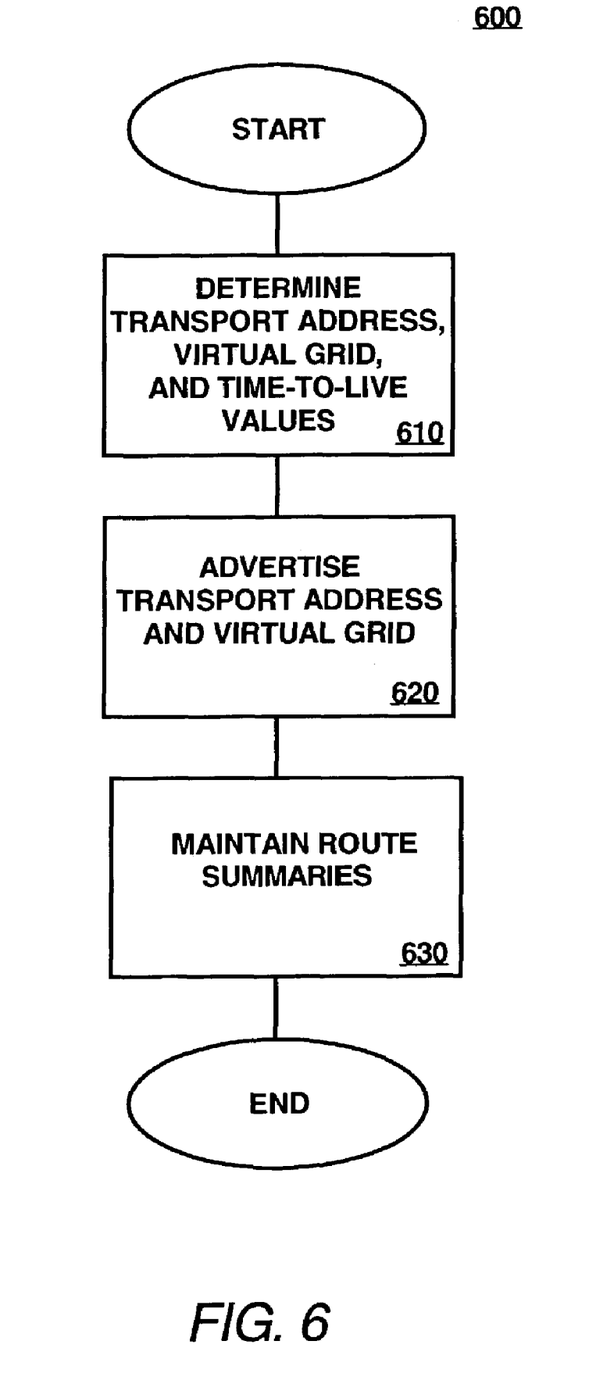
FIG. 6 illustrates a flow graph of an exemplary method for routing advertisement of expressway nodes using virtual grids according to an embodiment of the present invention.

FIG. 6 illustrates a flow graph of an exemplary method 600 to route advertisement for nodes using virtual grids. As shown in FIG. 6, a transport address, corresponding virtual grid ID, and a TTL value may be determined for a node (step 610). The node's transport address and the virtual grid 11 may be advertised (step 620). Also, route summaries may be maintained for the node (step 630). As noted above, typically, route summaries are maintained for each expressway node.

Note that each expressway node may perform steps 610 and 620 to advertise itself. Also, these steps may be performed by an external entity for each of the nodes. Likewise, each expressway node may perform step 630 to maintain its own route summary or the summaries may be maintained by an external entity and the expressway node may simply access its corresponding summary as needed, such as when forwarding packets of information.

Figure 7:
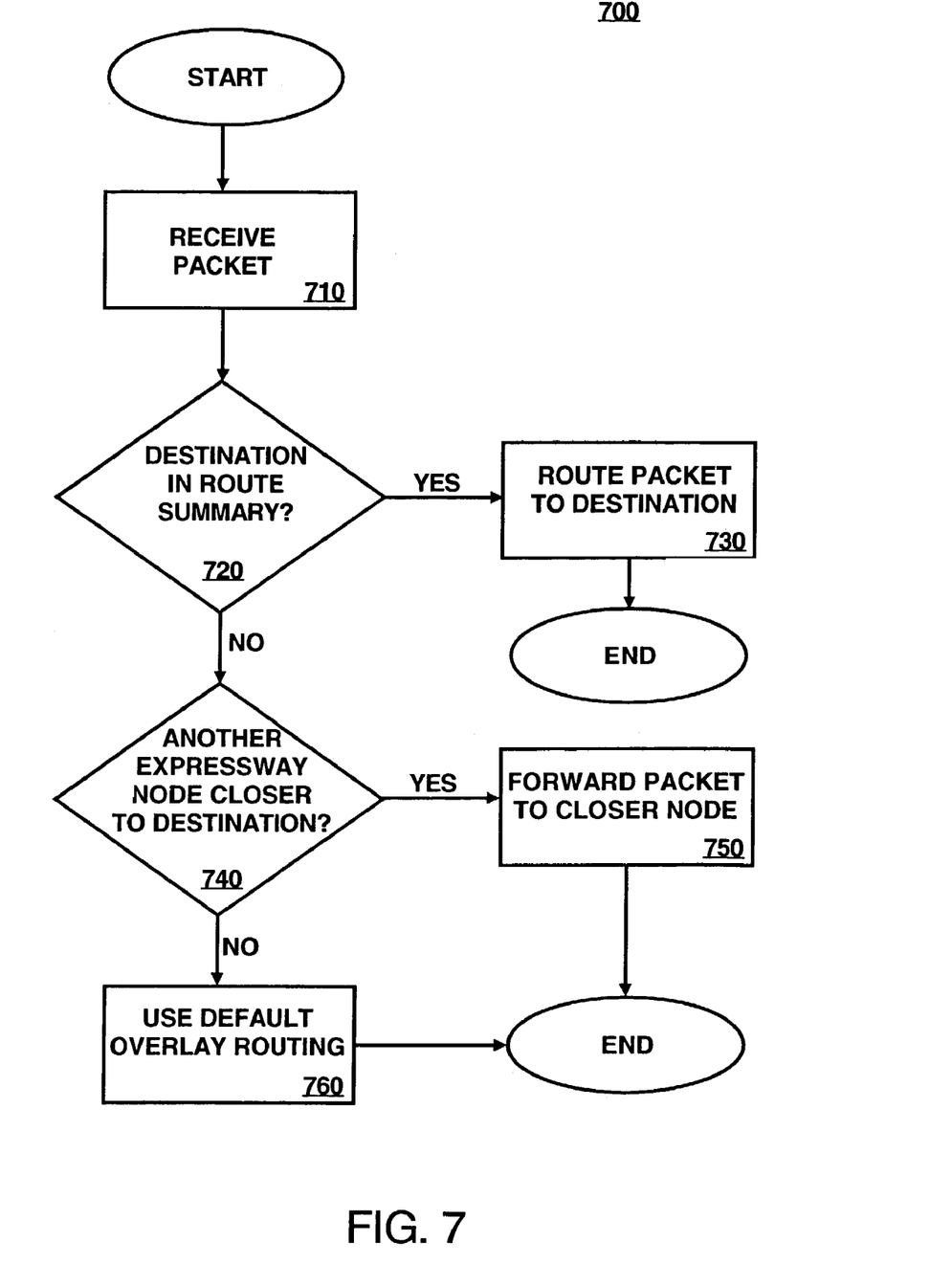
FIG. 7 illustrates a flow graph of an exemplary method for routing that an expressway node may perform to route information packets according to an embodiment of the present invention.

FIG. 7 illustrates a flow graph of an exemplary method 700 for routing that an expressway node may perform to route information packets. As shown in FIG. 7, after receiving an information packet (step 710), the expressway node may determine whether the packet destination is in the route summary (step 720). If the packet destination is in the route summary, then the expressway node may route the packet directly to the destination (step 730).

If the packet destination is not in its route summary, then the expressway node may determine if there is another expressway node that is closer to the destination (step 740). If there is a closer expressway node, then the expressway node may forward the packet to the closer node (step 750). As discussed previously, the concept of distance may be determined in a variety of ways. Therefore, determining which node is closer will be similarly varied.

If there is no closer expressway node, then the expressway node may use the default overlay routing, such as CAN and eCAN, to route the packet (step 760).

Figure 8:
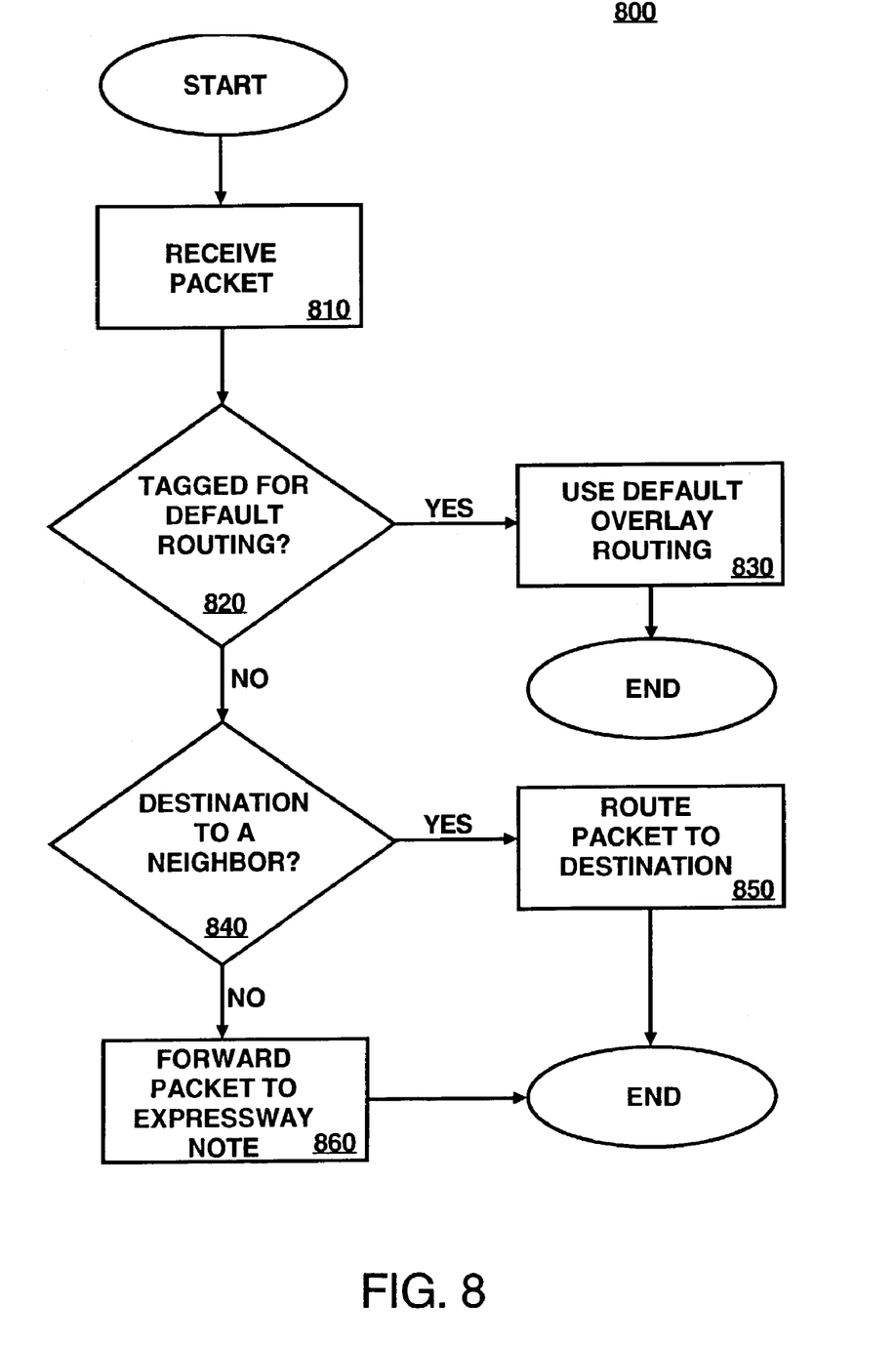
FIG. 8 illustrates a flow graph of an exemplary method for routing that an ordinary node may perform to route information packets according to an embodiment of the present invention.

FIG. 8 illustrates a flow graph of an exemplary method 800 for routing that an ordinary node may perform to route information packets. As shown in FIG. 8, after receiving an information packet (step 810), the ordinary node may determine whether the packet has been tagged to use the default overlay routing (step 820). If so, the ordinary node may used the default overlay routing to route the packet (step 830).

If the packet has not been so tagged, the expressway node may determine if the packet destination is to one of its neighbors (step 840). For example, the neighbor may in the same virtual grid ID, or the neighbor may a direct eCAN neighbor. A neighbor may be any node that the current node may directly forward the packet. If the destination is to one of the neighbors, then the ordinary node may forward the packet to the neighbor (step 850). If not, the ordinary node may forward the packet to an expressway node (step 860).

The combination of methods 700 and 800 guarantees that a packet will reach its destination. For example, if the destination is in the route summary, the expressway will route the packet to the destination or to a node that is close to the destination. If the expressway routes the packet to a node that is not the destination, from then on default routing is used to route the packet. If the destination is not in the route summary, again default routing is used.

While the invention has been described with reference to the exemplary embodiments thereof, it is to be understood that various modifications may be made to the described embodiments of the invention without departing from the spirit and scope of the invention. The terms and descriptions used herein are set forth by way of illustration only and are not meant as limitations. In particular, although the methods of the present invention has been described by examples, the steps of the method may be performed in a different order than illustrated or may be performed simultaneously. These and other variations are possible within the spirit and scope of the invention as defined in the following claims and their equivalents.

The invention claimed is:

1. A method for creating route summaries in an auxiliary network for a peer-to-peer (P2P) overlay network for routing a data packet, the method comprising:

organizing a logical space of the P2P overlay network as a d-dimensional Cartesian space of nodes in the P2P overlay network having default overlay network zones, each zone includes one or more of the nodes in the P2P overlay network;

dividing the d-dimensional Cartesian space of nodes in the P2P overlay network into multiple virtual grids that form the auxiliary network;

numbering each virtual grid;

summarizing the default overlay network zones of the P2P overlay network corresponding to each of the virtual grids that fort the auxiliary network, wherein the step of summarizing includes:

a) determining a center of each of the default overlay network zones; and b) correlating the center of each of the default overlay network zones to a corresponding virtual grid where the center falls into;

receiving a data packet; and routing the data packet to a packet destination using one of the P2P overlay network and the auxiliary network.

2. The method of claim 1, wherein the multiple virtual grids are of equal size.

3. The method of claim 1, wherein the number of virtual grids is $m^d$ wherein d is a dimensionally of the Cartesian space and m is an integer.

4. A method for advertising muting information using route summaries for an auxiliary network for a peer-to-peer (P2P) overlay network, wherein each of the route summaries includes a d-dimensional Cartesian space of nodes of the P2P overlay network mapped into multiple virtual grids that form the auxiliary network and default overlay network zones summarized into corresponding to virtual grids of the auxiliary network, the method comprising:

determining a virtual grid ID in the auxiliary network for one or more nodes of the P2P overlay network corresponding to each of the one or more nodes;

determining a transport address for each of the one or more nodes;

advertising and the transport address in the auxiliary network corresponding to each of the one or more nodes; and maintaining route summaries based on the advertised routing information, wherein the route summaries are maintained only for expressway nodes in the auxiliary networks.

5. The method of claim 4, further comprising determining a time-to-live (TTL) value for each of the one or more nodes.

6. The method of claim 5, wherein the TTL value for each of the one or more nodes is expressed as a number of expressway hops.

7. The method of claim 5, further comprising using the TTL value to control a propagation distance for an advertisement can be propagated.

8. A method for routing using an expressway node based route summary for an auxiliary network for P2P overlay network, wherein route summary includes a d-dimensional Cartesian space of nodes into multiple virtual grids and default overlay network zones are summarized into corresponding to virtual grids, the method comprising:

receiving a packet;

determining if a packet destination information is in a route summary for the expressway node;

routing the packet to the packet destination if it is determined that the packet destination information is in the route summary;

determining if another expressway node is closer to the packet destination if it is determined that the packet destination information is not in the route summary;

forwarding the packet to the another expressway node if it is determined that the another expressway node is closer to the packet destination; and routing the packet using the default overlay network if it is determined that the another expressway node is not closer to the packet destination.

9. A method for routing using an ordinary node based route summary for an auxiliary network for a P2P default overlay network, the method comprising:

providing the route summary that includes a d-dimensional Cartesian space of nodes in the default overlay network mapped into multiple virtual grids in the auxiliary network and default overlay network zones of the default overlay network summarized into corresponding virtual grids;

receiving a packet;

determining if the packet has been tagged to use the default overlay network for routing; and routing the packet using the default overlay network upon the determining that the packet has been tagged to use the default overlay network zones in the default overlay network; otherwise, routing the packet using the multiple virtual grids in the auxiliary network.

10. The method of claim 9, further comprising:

determining if packet destination is a neighbor node of the ordinary node; and forwarding the packet to the neighbor node if it is determined that the neighbor node is the packet destination.

11. The method of claim 10, further comprising forwarding the packet to an expressway node if it is determined that the neighbor node is not the packet destination.

12. The method of claim 10, wherein the neighbor node is at least one of:

another node in the same virtual grid Id of the ordinary node;

another node that is a direct neighbor in the default overlay; and another node that may receive packets directly from the expressway node.

* * * * *